United States Patent
Wagoner et al.

(10) Patent No.: US 10,110,149 B2
(45) Date of Patent: Oct. 23, 2018

(54) GROUNDING SCHEME FOR POWER CONVERTERS WITH SILICON CARBIDE MOSFETS

(71) Applicant: General Electric Company, Schenectady, NY (US)

(72) Inventors: Robert Gregory Wagoner, Roanoke, VA (US); Govardhan Ganireddy, Bangalore (IN); Saurabh Shukla, Clifton Park, NY (US); Ravisekhar Nadimpalli Raju, Clifton Park, NY (US); Harold Robert Schnetzka, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/399,803

(22) Filed: Jan. 6, 2017

(65) Prior Publication Data
US 2018/0198392 A1 Jul. 12, 2018

(51) Int. Cl.
*H02P 9/00* (2006.01)
*H02K 11/02* (2016.01)
(Continued)

(52) U.S. Cl.
CPC .............. *H02P 9/007* (2013.01); *F03D 9/255* (2017.02); *H02K 7/1838* (2013.01); *H02K 11/02* (2013.01); *H02K 11/40* (2016.01)

(58) Field of Classification Search
CPC ...... H02K 11/02; H02K 11/40; H02K 7/1838; F03D 9/255; H02P 9/007
See application file for complete search history.

(56) References Cited

U.S. PATENT DOCUMENTS 5,638,263 A 6/1997 Opal et al.
5,714,821 A * 2/1998 Dittman ................ H02K 19/28
30/180

(Continued)

FOREIGN PATENT DOCUMENTS

CN 103219738 A 7/2013
EP 2772770 A1 9/2014
(Continued)

OTHER PUBLICATIONS

International Search Report and Written Opinion issued in connection with corresponding PCT Application No. PCT/US2017/68198 dated Apr. 23, 2018.

*Primary Examiner* — Sean Gugger
(74) *Attorney, Agent, or Firm* — Dority & Manning, P.A.

(57) ABSTRACT

Systems and methods for grounding power generation systems with silicon carbide MOSFET power converters are provided. A power generation system can include a power generator comprising a multiphase rotor configured to generate multiphase alternating current power at a first voltage and a power converter comprising one or more silicon carbide MOSFETs and an isolation transformer. The power converter can be configured to convert the multiphase alternating current power from the power generator at the first voltage to multiphase alternating current power at a second voltage. The power generation system can be electrically grounded to shunt a leakage current associated with the isolation transformer of the power converter to a ground.

16 Claims, 8 Drawing Sheets

(51) Int. Cl.
*H02K 11/40* (2016.01)
*F03D 9/25* (2016.01)
*H02K 7/18* (2006.01)

(56) References Cited

U.S. PATENT DOCUMENTS

| | | | | |
|---|---|---|---|---|
| 5,982,645 | A * | 11/1999 | Levran | H01F 27/2866 |
| | | | | 307/66 |
| 5,986,909 | A | 11/1999 | Hammond et al. | |
| 6,081,080 | A * | 6/2000 | Davis | H02K 11/01 |
| | | | | 318/254.2 |
| 6,222,284 | B1 | 4/2001 | Hammond et al. | |
| 7,568,931 | B2 | 8/2009 | Hammond | |
| 7,800,254 | B2 | 9/2010 | Hammond | |
| 8,008,923 | B2 | 8/2011 | Hammond | |
| 8,093,764 | B2 | 1/2012 | Hammond | |
| 8,207,812 | B2 | 6/2012 | Roc et al. | |
| 8,441,147 | B2 | 5/2013 | Hammond | |
| 8,885,373 | B1 * | 11/2014 | Valiani | H02M 1/32 |
| | | | | 363/65 |
| 8,988,860 | B2 | 3/2015 | Hammond | |
| 9,048,694 | B2 | 6/2015 | Pan et al. | |
| 9,277,683 | B2 | 3/2016 | Ionescu et al. | |
| 2001/0048310 | A1 * | 12/2001 | Takahashi | G01R 31/346 |
| | | | | 324/551 |
| 2003/0161166 | A1 * | 8/2003 | Mutoh | H02M 1/12 |
| | | | | 363/50 |
| 2005/0012487 | A1 * | 1/2005 | Skeist | H02P 9/007 |
| | | | | 318/727 |
| 2010/0207590 | A1 * | 8/2010 | Anghel | H02P 9/14 |
| | | | | 322/61 |
| 2012/0086458 | A1 | 4/2012 | Wei et al. | |
| 2012/0275201 | A1 * | 11/2012 | Koyama | H02M 1/126 |
| | | | | 363/40 |
| 2014/0112032 | A1 | 4/2014 | Parkhou et al. | |
| 2015/0070939 | A1 * | 3/2015 | Gupta | H02J 3/36 |
| | | | | 363/17 |
| 2015/0171766 | A1 * | 6/2015 | Valiani | H02J 3/383 |
| | | | | 307/82 |
| 2015/0309123 | A1 * | 10/2015 | Berroteran Gil | G01R 31/40 |
| | | | | 324/764.01 |
| 2015/0343911 | A1 * | 12/2015 | White | B60L 11/12 |
| | | | | 290/16 |
| 2016/0079879 | A1 | 3/2016 | Ronner | |
| 2016/0266206 | A1 | 9/2016 | Thompson et al. | |

FOREIGN PATENT DOCUMENTS

| | | |
|---|---|---|
| EP | 3051680 A1 | 8/2016 |
| WO | WO 2015/110185 A1 | 7/2015 |
| WO | WO 2016/120335 A1 | 8/2016 |

* cited by examiner

GROUNDING SCHEME FOR POWER CONVERTERS WITH SILICON CARBIDE MOSFETS

FIELD

The present subject matter relates generally to power systems, and more particularly to systems and methods for grounding a power system including power converters utilizing silicon carbide MOSFETs.

BACKGROUND

Power generation systems can use power converters to convert power into a form of power suitable for an energy grid. In a typical power converter, a plurality of switching devices, such as insulated-gate bipolar transistors ("IGBTs") or metal-oxide-semiconductor field effect transistors ("MOSFETs") can be used in electronic circuits, such as half bridge or full-bridge circuits, to convert the power. Recent developments in switching device technology have allowed for the use of silicon carbide ("SiC") MOSFETs in power converters. Using SiC MOSFETs allows for operation of a power converter at a much higher switching frequency compared to conventional IGBTs.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a power generation system. The power generation system can include a power generator comprising a multiphase rotor. The power generator can be configured to generate multiphase alternating current power at a first voltage. The power generation system can also include a power converter comprising one or more silicon carbide MOSFETs and an isolation transformer. The power converter can be configured to convert the multiphase alternating current power from the power generator at the first voltage to multiphase alternating current power at a second voltage. The power generation system can further include a ground. The power generation system can be electrically grounded to shunt a leakage current associated with the isolation transformer of the power converter to the ground.

Another example aspect of the present disclosure is directed to a method of operating a power generation system. The method can include generating multiphase alternating current power at a first voltage with a power generator. The power generator can include a multiphase rotor and stator. The phases of the rotor can be configured in a delta or Wye configuration. Each phase of the rotor can include a high impedance resistor electrically connected to the phase and to a ground. The method can further include providing the multiphase alternating current power from the power generator to a power converter. The power converter can include one or more silicon carbide MOSFETs and an isolation transformer. The power converter can be configured to convert the multiphase alternating current power from the power generator at the first voltage to multiphase alternating current power at a second voltage. The method can further include sensing, by a control device, a voltage or current across the high impedance resistor of each phase of the rotor. The method can further include determining, by the control device, whether a voltage or current imbalance exists based at least upon the sensed voltage or current across the high impedance resistor of each phase of the rotor. When a voltage or current imbalance is determined to exist, the method can include shutting the power converter down by the control device to protect the power converter.

Another example aspect of the present disclosure is directed to power generation system. The power generation system can include a doubly fed induction generator comprising a multiphase rotor and a multiphase stator. The doubly fed induction generator can be configured to generate a multiphase low voltage power on the rotor side and a multiphase medium voltage power on the stator side. The power generation system can further include a low voltage bus electrically connected to the rotor. The power generation system can further include a medium voltage bus electrically connected to the stator. The power generation system can further include an AC to DC power converter electrically connected to the low voltage bus. The AC to DC power converter can be configured to receive low voltage power from the low voltage bus. The power generation system can further include a DC link electrically connected to the AC to DC power converter and configured to receive DC power from the AC to DC power converter. The power generation system can further include a DC to DC to AC power converter comprising at least one silicon carbide MOSFET and an isolation transformer. The DC to DC to AC power converter can be electrically connected to the DC link. The DC to DC to AC power converter can be configured to receive DC power from the DC link. The AC to DC power converter and the DC to DC to AC power converter can together be configured to convert the low voltage power from the multiphase rotor to medium voltage power. The power generation system can further include a ground. The power generation system can be electrically grounded to shunt a leakage current associated with the isolation transformer of the DC to DC to AC power converter to the ground.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for grounding a power system utilizing power converters with SiC MOSFETs and isolation transformers. For example, power generation systems, such as systems using doubly fed induction generators ("DFIGs"), can use one or more power converters to convert power into multiphase alternating current power suitable for a power grid. In some configurations, a power generation system can include a plurality of power converters, such as a first AC to DC converter and a second DC to DC to AC converter that includes an isolation transformer. The AC to DC and DC to DC to AC converters can convert the power from the power generator, such as a DFIG, from a low voltage to a medium voltage suitable for an electrical grid. This configuration can allow for the elimination of a three winding transformer at the grid interconnection, thereby reducing the cost of the power system.

However, in some applications, the primary-secondary capacitance and resistance associated with the isolation transformer can cause an associated leakage current to flow on the low voltage side of the power generation system. In such a case, the leakage current can cause faults to occur as a result of excessive voltage, and can damage the insulation system on the low voltage side of the power generation system if the system is not provided an adequately low level of impedance to earth. Further, any faults may disable or damage the power generator, and may require protection systems to trip the power generator offline, thereby reducing the availability of the power generation system.

Example aspects of the present disclosure are directed to systems and methods of grounding a low-voltage side of a power generator and/or power converter to shunt a leakage current associated with an isolation transformer of a power converter. For example, a power generation system can include a power generator, such as a doubly fed induction generator ("DFIG"), which can be configured to generate a multiphase (e.g., three phase) alternating current power at a first voltage and a second voltage. For example, a first voltage can be generated on the rotor side, which can be a low voltage. A second voltage power can be generated on the stator side, which can be a medium voltage power. In an embodiment, the medium voltage power from the stator can be provided to a medium voltage bus, and further can be provided to an electric grid, while the low voltage power can be provided to a low-voltage bus, and further to a power converter.

The power generation system can also include a power converter. The power converter can include an isolation transformer and one or more SiC MOSFETs. The power converter can be, for example, one or more power converters configured to convert the power from the first voltage, such as a low voltage, to the second voltage, such as a medium voltage. For example, a low-voltage ("LV") power can be a power less than or equal to about 1.5 kV, and a medium voltage ("MV") power can be a power greater than about 1.5 kV to less than about 100 kV. As use herein, the term "about" means within 20% of the stated value.

For example, a power converter can include a first AC to DC converter, which can convert the low voltage multiphase alternating current power into a DC power. The first AC to DC converter can be, for example, a two-level AC to DC power converter. The AC to DC converter can be coupled to a low voltage bus, which can receive the low voltage power from the rotor. The AC to DC converter can further be coupled to a DC link. A second converter, such as a DC to DC to AC converter, can further be coupled to the DC link. The second converter can be configured to receive the DC power from the DC link, and convert the DC power into an AC power at a second voltage, such as AC power at the medium voltage such that the converted power is at the same voltage as the electric grid, and/or the power provided by the stator. In an embodiment, the second converter can be a DC to DC to AC converter, and can include one or more SiC MOSFETs and an isolation transformer.

The power generation system can be electrically grounded to shunt a leakage current associated with the isolation transformer of the power converter to a ground. For example, at least one phase of a rotor can be electrically connected to a ground. The power generation system can be electrically grounded to shunt a leakage current associated with the isolation transformer to the ground through the at least one phase electrically connected to the ground. Another embodiment, one or more high impedance resistor(s) can be electrically connected to the at least one phase and the ground. The high impedance resistor(s) can be resistor(s) selected to carry a leakage current across all insulation barriers from all leakage current sources, including capacitance for high frequency AC sources, such as SiC MOSFETs. Further, the high impedance resistor(s) can be selected to ensure that any surge protectors, such as metal oxide varistors ("MOVs") connected to the power generation system do not carry the leakage current. The power generation system can be configured to shunt the leakage current associated with the isolation transformer to the ground through the high impedance resistor.

In an embodiment, each phase of the rotor can include a high impedance resistor electrically connected to the phase and a ground. In such a configuration, the power generation system can be electrically grounded to shunt a leakage current associated with the isolation transformer to the ground through one or all of the high impedance resistors. For example, the phases of a rotor could be configured in a delta configuration, wherein each phase is coupled to a high impedance resistor which is further coupled to a ground. In another configuration, the phases of the rotor can be in a Wye configuration, wherein each phase is coupled to a high impedance resistor which is further coupled to a ground. In either the Wye or delta configuration, a leakage current can be shunted to ground through the high impedance resistors.

Further, the power generation system can include a control device, which can be configured to sense a voltage or current imbalance across the high impedance resistors. The control device can further be configured to shut down the power converter, open one or more switches (not shown), or perform other control actions to electrically isolate the faulted power generation unit when the control device senses a voltage or current imbalance across the high impedance resistors.

In an embodiment, the phases of the rotor can be in a Wye configuration which can include a midpoint. A neutral conductor can be connected to the midpoint and a ground. The power generation system can electrically shunt a leakage current associated with the isolation transformer to the ground through the neutral conductor. Further, a high impedance resistor can be connected to the neutral conductor and a ground. Such a configuration, the power generation system can shunt the leakage current to the ground through the high impedance resistor.

The power generation system can further be grounded by connecting at least one pole of the DC link to a ground. For example, a DC link can include a first pole at a first voltage and a second pole at a second voltage. Either the first pole or the second pole can be electrically connected to a ground. The power generation system can be electrically grounded to shunt a leakage current associated with the isolation transformer through the at least one pole of the DC link connected to the ground. In an embodiment, a high impedance resistor can be connected to the at least one pole of the DC link and the ground. The power generation system can be electrically grounded to shunt the leakage current associated with the isolation transformer to the ground through the high impedance resistor connected to the at least one pole of the DC link.

The power generation system can further include one or more filters. For example, each phase of a multiphase power from the rotor can be filtered to remove one or more frequencies from the AC power. The filter can include, for example, an inductor and a capacitor. For example, filter can include an inductor electrically coupled to the low voltage bus and a terminal of the AC to DC converter. The capacitor can be electrically coupled to the inductor and a ground. The power generation system can be electrically grounded to shunt a leakage current through the capacitor of a filter. In an embodiment, each phase can include a filter, wherein the power generation system can shunt the leakage current associated with the isolation transformer through the capacitor of each filter on each phase.

The power generation system can further include a multiphase crowbar circuit. The multiphase crowbar circuit can be used to prevent an overvoltage condition from damaging the power generation system.

In this way, the systems and methods according to example aspects of the present disclosure can have a technical effect of grounding the low-voltage side of a power system in order to shunt a leakage current associated with an isolation transformer to a ground. This can help to ensure that the insulation system of the power generation system is not damaged by high voltage as a result of leakage current flow. Further, this can allow for increased reliability and/or availability of the power generation system. Additionally, in configurations in which a high impedance resistor is used to ground the power generation system, the fault current can be limited, which can reduce the incident energy associated with an arc flash.

Figure 1:
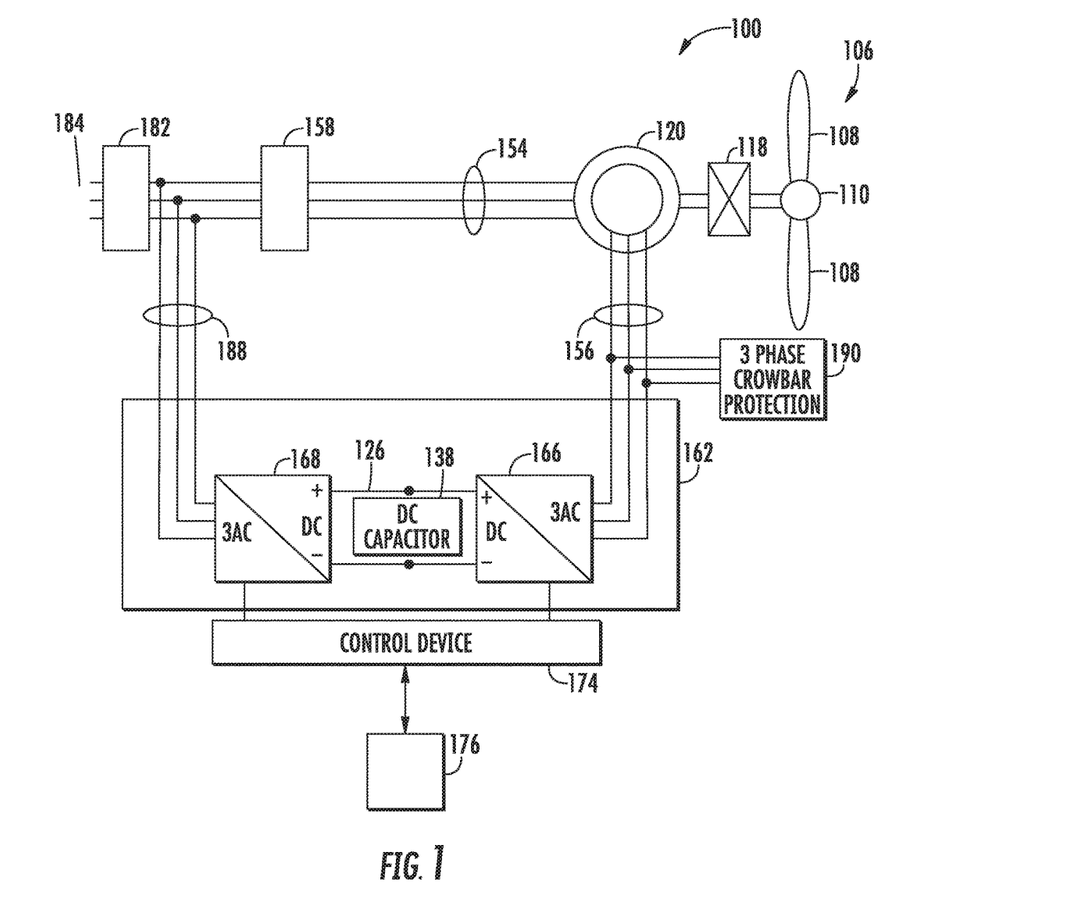
FIG. 1 depicts an example power generation system.

With reference now to the figures, example aspects of the present disclosure will be discussed in greater detail. FIG. 1 depicts a power generation system 100 according to example aspects of the present disclosure, which includes a DFIG 120. The present disclosure will be discussed with reference to the example power generation system 100 of FIG. 1 for purposes of illustration and discussion. Those of ordinary skill in the art, using the disclosures provided herein, should understand that aspects of the present disclosure are also applicable in other systems, such as full power conversion wind turbine systems, solar power systems, energy storage systems, and other power systems.

In the example power generation system 100, a rotor 106 includes a plurality of rotor blades 108 coupled to a rotating hub 110. In the exemplary embodiment, the power generation unit includes a gear box 118, which is, in turn, coupled to a generator 120. In accordance with aspects of the present disclosure, the generator 120 is a doubly fed induction generator (DFIG) 120.

DFIG 120 is typically coupled to a stator bus 154 and a power converter 162 via a rotor bus 156. The stator bus provides an output multiphase power (e.g. three-phase power) from a stator of DFIG 120 and the rotor bus 156 provides an output multiphase power (e.g. three-phase power) of DFIG 120. The power converter 162 can be a bidirectional power converter configured to provide output power to the electrical grid 184 and/or to receive power from the electrical grid 184. As shown, DFIG 120 is coupled via the rotor bus 156 to a rotor side converter 166. The rotor side converter 166 is coupled to a line side converter 168 which in turn is coupled to a line side bus 188. An auxiliary power feed can be coupled to the line side bus 188 to provide power for components used in the wind turbine system, such as fans, pumps, motors, and other components of the wind turbine system.

In example configurations, the rotor side converter 166 and/or the line side converter 168 are configured for normal operating mode in a three-phase, pulse width modulation (PWM) arrangement using SiC MOSFETs and/or IGBTs as switching devices. SiC MOSFETs can switch at a very high frequency as compared to conventional IGBTs. For example, SiC MOSFETs can be switched at a frequency from approximately 0.01 Hz to 10 MHz, with a typical switching frequency of 1 KHz to 400 KHz, whereas IGBTs can be switched at a frequency from approximately 0.01 Hz to 200 KHz, with a typical switching frequency of 1 KHz to 20 KHz. Additionally, SiC MOSFETs can provide advantages over ordinary MOSFETs when operated in some voltage ranges. For example, in power converters operating at 1200V-1700V on the LV side, SiC MOSFETs have lower switching and conduction losses than ordinary MOSFETs.

In some implementations, the rotor side converter 166 and/or the line side converter 168 can include a plurality of conversion modules, each associated with a an output phase of the multiphase power, as will be discussed in more detail with respect to FIGS. 2 and 3. The rotor side converter 166 and the line side converter 168 can be coupled via a DC link 126 across which can be a DC link capacitor 138.

In some embodiments, the DC link 126 can include a dynamic brake (not shown). The dynamic brake can include a switching element (e.g., an IGBT) coupled in series with a dissipative element (e.g., a resistor). The switching element can be controlled using pulse width modulation techniques via one or more control devices (e.g., controller 174 or control system 176) to control the voltage on the DC link 126.

In some embodiments, the DC link 126 can include a plurality of resistors (e.g., two resistors) coupled in series between the positive and negative bus. A ground can be coupled at a midpoint between the resistors.

The power converter 162 can be coupled to a control device 174 to control the operation of the rotor side converter 166 and the line side converter 168. It should be noted that the control device 174, in typical embodiments, is configured as an interface between the power converter 162 and a control system 176.

In operation, power generated at DFIG 120 by rotating the rotor 106 is provided via a dual path to electrical grid 184. The dual paths are defined by the stator bus 154 and the rotor bus 156. On the stator bus side 154, sinusoidal multiphase (e.g. three-phase) is provided to the electrical grid. In particular, the AC power provided via the stator bus 154 can be a medium voltage ("MV") AC power. As used herein, MV AC power can be an alternating current power greater than about 1.5 kilovolts and less than about 100 kilovolts. As used herein, the term "about" can mean within 20% of the stated value. On the rotor bus side 156, sinusoidal multiphase (e.g. three-phase) AC power is provided to the power converter 162. In particular, the AC power provided to the power converter 162 via the rotor bus 156 can be a low voltage ("LV") AC power. As used herein, LV AC power can be an alternating current power less than or equal to about 1.5 kilovolts. The rotor side power converter 166 converts the LV AC power provided from the rotor bus 156 into DC power and provides the DC power to the DC link 126. Switching devices (e.g. SiC MOSFETs and/or IGBTs) used in parallel bridge circuits of the rotor side power converter 166 can be modulated to convert the AC power provided from the rotor bus 156 into DC power suitable for the DC link 126. Such DC power can be a LV DC power.

In a power generation system 100, the power converter 162 can be configured to convert the LV power to MV AC power. For example, the line side converter 168 converts the LV DC power on the DC link 126 into a MV AC power suitable for the electrical grid 184. In particular, SiC MOSFETs used in bridge circuits of the line side power converter 168 can be modulated to convert the DC power on the DC link 126 into AC power on the line side bus 188. SiC MOSFETs can be operated at a higher switching frequency than conventional IGBTs. In addition, one or more isolation transformers coupled to one or more of the bridge circuits can be configured to step the voltage up or down as needed. Additionally, a plurality of inverter blocks can be connected in series on the MV side to collectively step up the voltage of the power on the DC link 126 to a MV AC power. The MV AC power from the power converter 162 can be combined with the MV power from the stator of DFIG 120 to provide multiphase power (e.g. three-phase power) having a frequency maintained substantially at the frequency of the electrical grid 184 (e.g. 50 Hz/60 Hz). In this manner, the MV line side bus 188 can be coupled to the MV stator bus 154 to provide such multiphase power Various circuit breakers and switches, such as grid breaker 182, stator sync switch 158, etc. can be included in the power generation system 100 for isolating the various components as necessary for normal operation of DFIG 120 during connection to and disconnection from the electrical grid 184. In this manner, such components can be configured to connect or disconnect corresponding buses, for example, when current flow is excessive and can damage components of the power generation system 100 or for other operational considerations. Additional protection components can also be included in the power generation system 100. For example, as depicted in FIG. 1, a multiphase crowbar circuit 190 can be included to protect against an overvoltage condition damaging circuits of the power generation system 100.

The power converter 162 can receive control signals from, for instance, the control system 176 via the control device 174. The control signals can be based, among other things, on sensed conditions or operating characteristics of the power generation system 100. Typically, the control signals provide for control of the operation of the power converter 162. For example, feedback in the form of sensed speed of the DFIG 120 can be used to control the conversion of the output power from the rotor bus 156 to maintain a proper and balanced multiphase (e.g. three-phase) power supply. Other feedback from other sensors can also be used by the control device 174 to control the power converter 162, including, for example, stator and rotor bus voltages and current feedbacks. Using the various forms of feedback information, switching control signals (e.g. gate timing commands for switching devices), stator synchronizing control signals, and circuit breaker signals can be generated. In an embodiment, the control device 174 can be configured to sense a voltage or current imbalance across one or more high impedance resistors in a power generation system 100. For example, as will be discussed in greater detail below, each phase of a multiphase power from a rotor of a DFIG 120 can include a high impedance resistor electrically connected between the phase and a ground. In an embodiment, the control device 174 can be configured to determine whether a voltage or current imbalance exists across the high impedance resistors, and further can be configured to shut down the power converter 162 when the control device 174 determines a voltage or current imbalance across the high impedance resistors exists.

Figure 2:
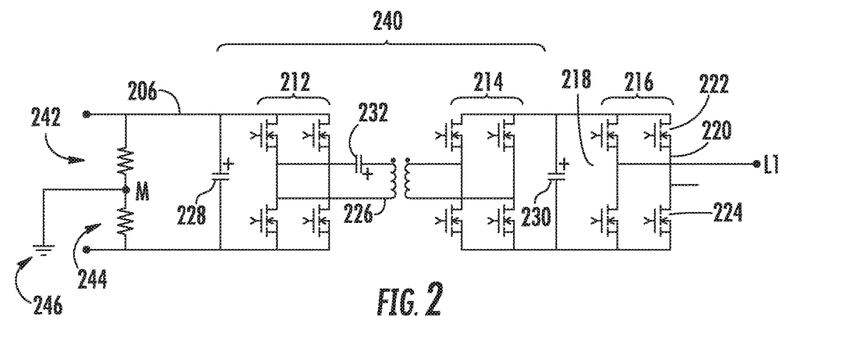
FIG. 2 example elements for use in a power converter according to example aspects of the present disclosure.

Referring now to FIG. 2, a topology of a component in a DC to DC to AC converter is depicted. FIG. 2 depicts an example DC to DC to AC inverter block 206, which can be included in a conversion module 200 of a line side converter 168, as depicted in FIG. 3. Each inverter block 206 can include a plurality of conversion entities. For instance, inverter block 206 can include conversion entity 212, conversion entity 214, and conversion entity 216. Each conversion entity 212-216 can include a plurality of bridge circuits coupled in parallel. For instance, conversion entity 216 includes bridge circuit 218 and bridge circuit 220. As indicated, each bridge circuit can include a plurality of switching devices coupled in series. For instance, bridge circuit 220 includes an upper switching device 222 and a lower switching device 224. The switching devices can be SiC MOSFETs, which can be operated at higher switching frequencies than conventional IGBTs. As shown, inverter block 206 further includes an isolation transformer 226. The isolation transformer 226 can be coupled to conversion entity 212 and conversion entity 214. As shown, the inverter block 206 can further include capacitors 228 and 230.

First conversion entity 212, isolation transformer 226, and second conversion entity 214 can together define an inner converter 240. Inner converter 240 can be operated to convert a LV DC power from the DC link 126 to a second LV DC power bus at the outer converter. In an embodiment, inner converter 240 can be a high-frequency resonant converter. In a resonant converter configuration, a resonant capacitor 232 can be included in inner converter 240. In various embodiments, a resonant capacitor 232 can be included on a LV side of the isolation transformer 226 as depicted in FIG. 2, on an MV side of the isolation transformer 226 (not depicted), or on both the LV and MV sides of the isolation transformer 226 (not depicted). In another embodiment, inner converter 240 can be a hard-switched converter by removing the resonant capacitor 232. Third conversion entity 216 can also be referred to as an outer converter 216. Outer converter 216 can convert a LV DC power from the inner converter to a LV AC power suitable for use on an energy grid 184. In a typical application, outer converter 216 can be a hard-switched converter, and therefore not include a resonant capacitor.

Additionally, as depicted in FIG. 2, in an embodiment, a plurality of resistors (e.g., resistors 242 and 244) can be coupled across the DC link 126, and together can define a midpoint ("M"). In an embodiment, the midpoint "M" can be can be connected to a ground 246. The resistors 242 and 244 can be, for example, high impedance resistors selected to carry a leakage current associated with the isolation transformer. Further, in an embodiment, a leakage current associated with the isolation transformer of the power converter can be shunted to the ground through at least one of the plurality of resistors.

Figure 3:
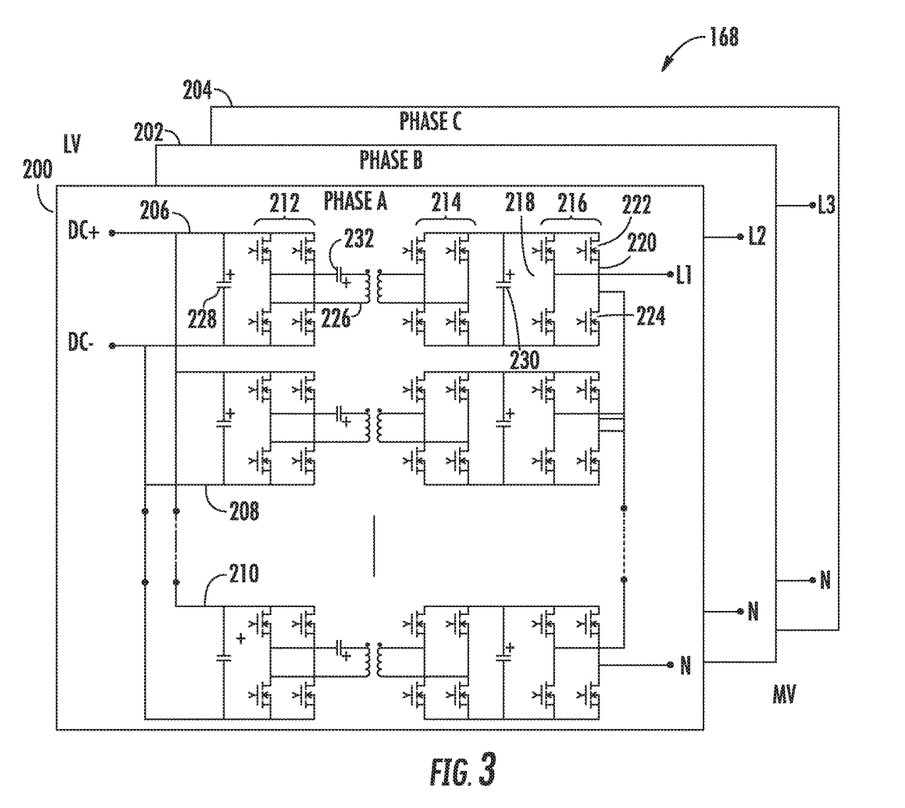
FIG. 3 depicts an power converter according to example aspects of the present disclosure.

FIG. 3 depicts an example line side converter 168 according to example embodiments of the present disclosure. As shown, the line side converter 168 includes conversion module 200, conversion module 202, and conversion module 204. The conversion modules 200-204 can be configured to receive a LV DC power from the rotor side converter 166, and to convert the LV DC power to a MV AC power for feeding to the electrical grid 184. Each conversion module 200-204 is associated with a single phase of three-phase output AC power. In particular, conversion module 200 is associated with the phase A output of the three-phase output power, conversion module 202 is associated with the phase B output of the three-phase output power, and conversion module 204 is associated with the phase C output of the three-phase output power.

Each conversion module 200-204 includes a plurality of inverter blocks 206-210. For instance, as shown, conversion module 200 includes inverter blocks 206, inverter block 208, and inverter block 210. In an embodiment, each conversion module 200-204 can include any number of inverter blocks 206-210. The line side converter 168 can be a bidirectional power converter. The line side converter 168 can be configured to convert a LV DC power to a MV AC power and vice versa. For instance, when providing power to the electrical grid 184, the line side converter 168 can be configured to receive a LV DC power from the DC link 126 on a LV side of the line side converter 168, and to output a MV AC power on a MV side of the line side converter 168. The inverter blocks 206-210 can be coupled together in parallel on the LV side and can be coupled together in series on the MV side.

In one particular example implementation, when providing power to the electrical grid 184, the conversion entity 212 can be configured to convert the LV DC on the DC link 126 to a LV AC power. The isolation transformer 226 can be configured to provide isolation. The conversion entity 214 can be configured to convert the LV AC power to a LV DC power. The conversion entity 216 can be configured to convert the LV DC power to a LV AC power suitable for provision to the electric grid 184. A plurality of inverter blocks can be connected in series to build a MV AC voltage suitable for use on a MV AC energy grid.

The inverter blocks 206-210 can be configured to contribute to the overall MV AC power provided by the conversion module 200. In this manner, any suitable number of inverter blocks can be included within the inverter blocks 206-210. As indicated, each conversion module 200-204 is associated with a single phase of output power. In this manner, the switching devices of the conversion modules 200-204 can be controlled using suitable gate timing commands (e.g. provided by one or more suitable driver circuits) to generate the appropriate phase of output power to be provided to the electrical grid. For example, the control device 174 can provide suitable gate timing commands to the gates of the switching devices of the bridge circuits. The gate timing commands can control the pulse width modulation of the SiC MOSFETs and/or IGBTs to provide a desired output.

It will be appreciated, that although FIG. 3 depicts only the line side converter 168, the rotor side converter 166 depicted in FIG. 2 can include the same or similar topology. In particular, the rotor side converter 166 can include a plurality of conversion modules having one or more conversion entities as described with reference to the line side converter 168. Further, it will be appreciated that the line side converter 168 and the rotor side converter 166 can include SiC MOSFETs, IGBT switching devices, and/or other suitable switching devices. In implementations wherein the rotor side converter 166 is implemented using SiC MOSFETs, the rotor side converter 166 can be coupled to a crowbar circuit (e.g. multiphase crowbar circuit 190) to protect the SiC MOSFETs from high rotor current during certain fault conditions.

Referring generally to FIGS. 1-3, the LV side, or rotor side, of a power generation system 100 may need a method of voltage control to ensure the insulation system on the LV side is not damaged by a high voltage as a result of leakage current flow. For example, the isolation transformer 226 in a power converter 162 configured to convert a LV power to a MV power contains parasitic coupling capacitances between the two windings and between the windings and an earth reference which produce leakage currents. These capacitance effects can cause excessive transient voltages within the power converter 162, which, if ungrounded, can cause faults to occur. During faults, the insulation system on a power converter or power generator may be compromised, thereby disabling the power generation system or requiring it to be taken off-line. According to example aspects of the present disclosure, a power generation system 100 can be electrically grounded to shunt a leakage current associated with the isolation transformer 226 of the power converter 162 to a ground.

Figure 4:
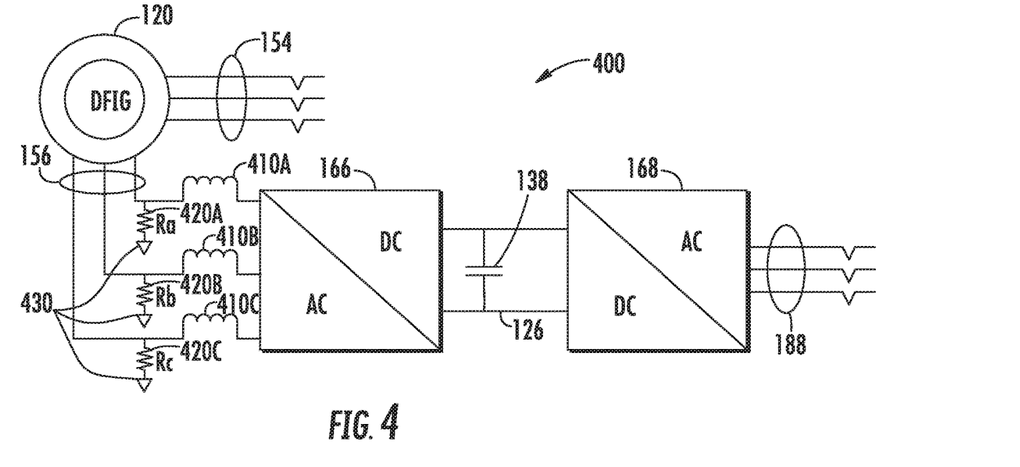
FIG. 4 depicts an example power system according to example aspects of the present disclosure.

Referring now to FIG. 4, an example power generation system 400 according to example aspects of the present disclosure is depicted. Elements that are the same or similar to those in FIGS. 1-3 are referred to with the same reference numeral. As shown in FIG. 4, a DFIG 120 includes a rotor side and a stator side. The stator side is connected to a stator side bus 154. The rotor side is connected to a rotor side bus 156. Power provided by the rotor of the DFIG 120 is provided to the rotor side bus 156, and to a rotor side converter 166, which can be an AC to DC converter. Each phase of the three-phase power from the rotor can be filtered by a filter 410. For example, as shown in FIG. 4, a first filter 410A filters first phase A, a second filter 410B filters a second phase B, and a third filter 410C filters a third phase C. The rotor side converter 166 can convert the multiphase AC power into DC power and provide the DC power to a DC link 126. A DC bus capacitor 138 can be connected to the DC link 126. A line side converter 168 can convert the DC power from the DC link 126 into multiphase AC power and provide the multiphase AC power to a line side bus 188. The power provided by the line side converter 168 can be suitable for application to a grid 184. For example a line side converter 168 can be a DC to DC to AC converter configured to convert LV power to a MV power. In an embodiment, the line side converter 168 can include one or more SiC MOSFETs and an isolation transformer.

In an embodiment, at least one phase of the rotor side of the DFIG 120 can be electrically connected to a ground 430. For example, as shown in FIG. 4, each phase of the rotor side bus is electrically connected to a ground 430. In additional embodiments, any number of phases can be electrically connected to a ground 430. The power generation system can be electrically grounded to shunt a leakage current associated with the isolation transformer of the power converter to the ground 430 through the at least one phase of the rotor electrically connected to the ground 430. For example, an isolation transformer 226 in a line side converter 168 may cause capacitance effect, particularly in instances in which power converter utilizes high frequency switching SiC MOSFETs. The capacitance effect may induce a leakage current within the power converter, which can be shunted to ground through the at least one phase connected to a ground 430. In an embodiment, a high impedance resistor 420 can be electrically connected to the at least one phase and the ground 430. For example, as shown in FIG. 4, each phase includes a high impedance resistor 420 electrically connected between the phase and the ground 430, a first high impedance resistor 420A for phase A, a second high impedance resistor 420B for phase B, and a third high impedance resistor 420C for phase C. In additional embodiments, any number of phases can include a high impedance resistor 420 electrically connected between the phase and the ground 430.

The high impedance resistor can be selected to carry a leakage current associated with the isolation transformer of the power converter. For example, the high impedance resistor 420 can be a resistor selected to carry the leakage current across insulation barriers from all leakage current sources, including leakage current caused by high-frequency AC sources, such as SiC MOSFETs, through stray capacitances in the insulation system. Additionally, the high impedance resistor(s) 420 can be selected based on the ratings and capabilities of surge protection devices, such as MOVs (not shown). For example, the high impedance resistor 420 can be selected to ensure that MOVs do not end up carrying the leakage current.

In configurations in which at least one phase of the rotor is electrically connected to a high impedance resistor 420 which is connected to the ground 430, the power generation system 400 can be electrically grounded to shunt a leakage current associated with the isolation transformer of the power converter 162 to the ground 430 through the high impedance resistor 420. By including a high impedance resistor 420 between the at least one phase and the ground 430, the fault current to ground can be limited, which can reduce the risk of the incident energy associated with an arc flash event.

Figure 5:
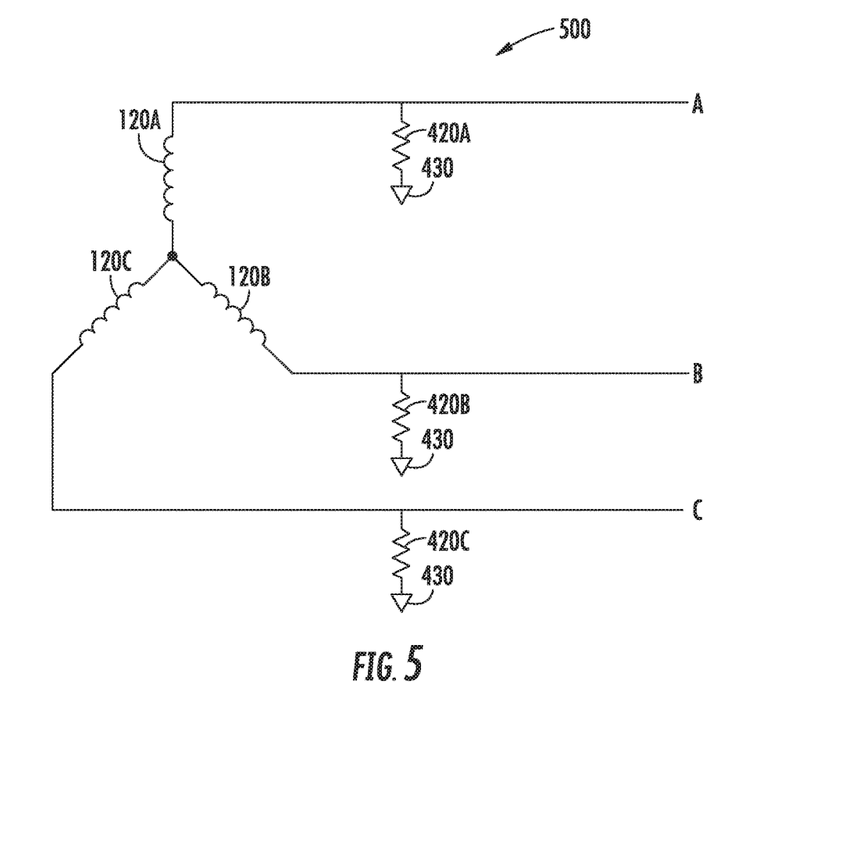
FIG. 5 depicts an example power generation configuration according to example aspects of the present disclosure.

Referring now to FIG. 5, an example configuration of a power system 500 according to example aspects of the present disclosure is depicted. The power system 500 can correspond to the power system 400 depicted in FIG. 4. Elements that are the same or similar to those in previous FIGS. are labeled with the same reference numerals. As shown, power system 500 can include a multiphase DFIG 120 connected in a Wye configuration. For example, as shown in FIG. 5, DFIG 120 includes three rotor windings for each of the three rotor phases, rotor winding 120A configured to generate power for phase A, rotor winding 120B configured to generate power for phase B, and rotor winding 120C configured to generate power for phase C. A high impedance resistor 420 can be electrically connected to one or more phases of the DFIG 120. For example, as shown a first high impedance resistor 420A is electrically connected between phase A and the ground 430, a second high impedance resistor 420B is electrically connected between phase B and the ground 430, and a third high impedance resistor 420C is electrically connected between phase C and the ground 430. The leakage current from a power converter 162 can be shunted to ground 430 through these high impedance resistors 420.

In an embodiment, the control device, such as a control device 174, can be configured to sense a voltage or current across each high impedance resistor 420 connected to the phases of a DFIG 120. For example, each phase can include a high impedance resistor 420 connected between the phase and the ground 430. A voltage or current sensor can be configured to sense a voltage across and/or current through the high impedance resistors 420. Further, the sensors can be configured to provide the sensed values to a control device, such as a control device 174. The control device can be configured to determine whether a voltage or current imbalance exists based on the sensed values, and further can be configured to shut down the power converter 162, open one or more switches (not shown), or perform other control actions to electrically isolate the faulted power generation unit when the control device 174 determines a voltage or current imbalance across the high impedance resistors 420 exists.

Figure 6:
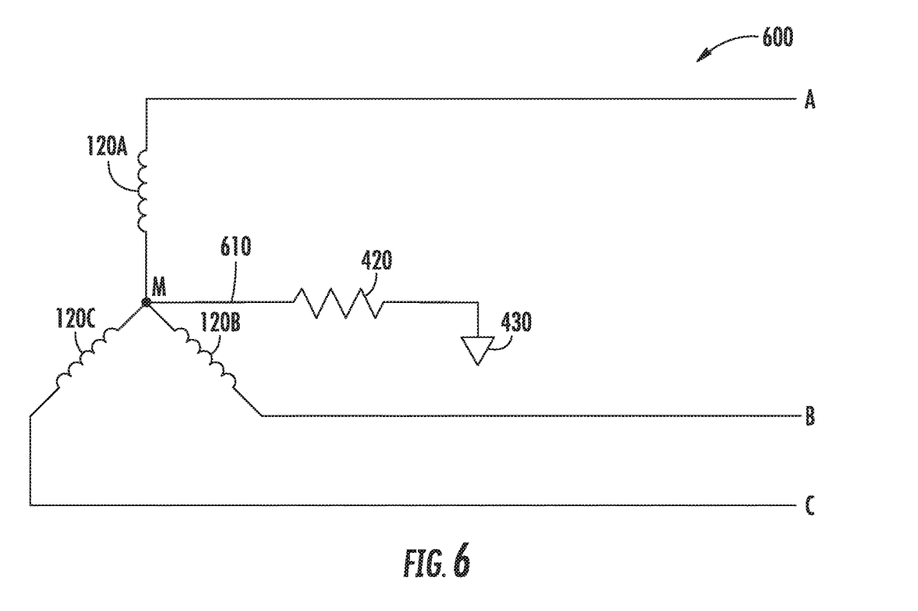
FIG. 6 depicts an example power generation configuration according to example aspects of the present disclosure.

Referring now to FIG. 6, an example configuration of a power system 600 according to example aspects of the present disclosure is depicted. The power system 600 can correspond to the power system 400 depicted in FIG. 4. Elements that are the same or similar to those in previous FIGS. are labeled with the same reference numerals. As shown, power system 600 can include a multiphase DFIG 120 connected in a Wye configuration. For example, as shown in FIG. 6, DFIG 120 includes three rotor windings for each of the three phases, rotor winding 120A configured to generate power for phase A, rotor winding 120B configured to generate power for phase B, and rotor winding 120C configured to generate power for phase C. Further, as depicted in FIG. 6, the three phases of the DFIG 120 connected in a Wye configuration can together define a midpoint M. A neutral conductor 610 can be electrically connected to the midpoint M and the ground 430.

For example, as shown in FIG. 6, a neutral conductor 610 is electrically connected between the midpoint M and the ground 430. Further, a high impedance resistor 420 is electrically connected to the neutral conductor 610 between the midpoint M and the ground 430. In an embodiment, the neutral conductor 610 can be electrically connected between the midpoint M and the ground 430 without a high impedance resistor 420. The power generation system 600 can be electrically grounded to shunt a leakage current associated with the isolation transformer of the power converter 162 to the ground 430 through the neutral conductor 610. Further, in applications in which a high impedance resistor 420 is electrically connected to the neutral conductor, the power generation system 600 can be electrically grounded to shunt a leakage current associated with the isolation transformer and other components of the power converter 162 to the ground 430 through the high impedance resistor 420.

Figure 7:
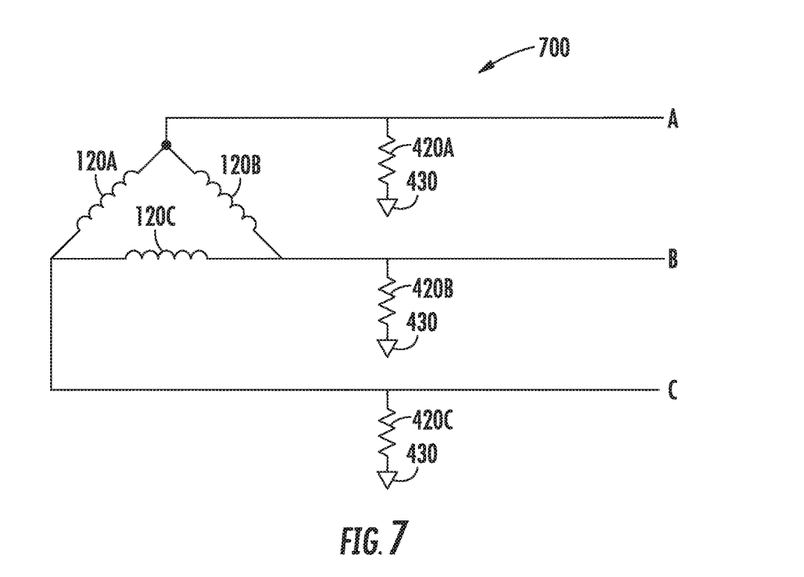
FIG. 7 depicts an example power generation configuration according to example aspects of the present disclosure.

Referring now to FIG. 7, an example configuration of a power system 700 according to example aspects of the present disclosure is depicted. The power system 700 can correspond to the power system 400 depicted in FIG. 4. Elements that are the same or similar to those in previous FIGS. are labeled with the same reference numerals. As shown, power system 700 can include a multiphase DFIG 120 connected in a delta configuration. For example, as shown in FIG. 7, DFIG 120 includes a rotor winding with three phases, windings 120A and 120B configured to generate power for phase A, windings 120B and 120C configured to generate power for phase B, and windings 120C and 120A configured to generate power for phase C. A high impedance resistor 420 can be electrically connected to one or more phases of the DFIG 120. For example, as shown a first high impedance resistor 420A is electrically connected between phase A and the ground 430, a second high impedance resistor 420B is electrically connected between phase B and the ground 430, and a third high impedance resistor 420C is electrically connected between phase C and the ground 430. The leakage current from a power converter 162 can be shunted to ground 430 through these high impedance resistors 420.

Further, a control device, such as a control device 174, can be configured to determine whether a voltage or current imbalance exists across each high impedance resistor 420 connected to the phases of a DFIG 120. For example, each phase can include a high impedance resistor 420 connected between the phase and the ground 430. A voltage or current sensor can be configured to sense a voltage across and/or current through the high impedance resistors 420. Further, the sensors can be configured to provide the sensed values to the control device, such as a control device 174. The control device can be configured to determine whether a voltage or current imbalance exists based on the sensed values, and further can be configured to shut down the power converter 162 when the control device 174 determines a voltage and/or current imbalance exists across the high impedance resistors 420.

Figure 8:
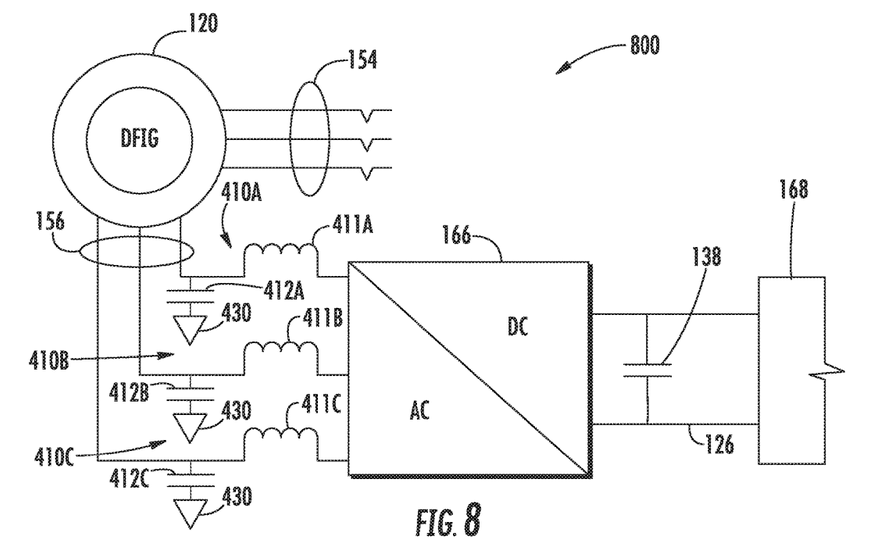
FIG. 8 depicts an example power system according to example aspects of the present disclosure.

Referring now to FIG. 8, a power generation system 800 according to example aspects of the present disclosure is depicted. Elements that are the same or similar to those as depicted in previous FIGS. are referred to with the same reference numerals. As shown, a DFIG 120 includes a rotor connected to a rotor side bus 156 and a stator connected to a stator side bus 154. In an embodiment, at least one phase of a multiphase power provided by a rotor of a DFIG 120 can be connected to a filter 410. The filter 410 can be, for example, and inductor 411 and a capacitor 412, wherein the capacitor 412 is electrically connected to a ground 430. The at least one filter 410 can be electrically connected to the at least one phase of the rotor. Additionally, each phase of the rotor can be electrically connected to a filter 410. Each filter 410 can include an inductor 411 and a capacitor 412.

For example, as shown in FIG. 8, phase A of the three-phase power from the rotor includes a first filter 410A, which includes an inductor 411A electrically connected between the rotor side converter 166 and the rotor side bus 156. Additionally, the first filter 410A includes a capacitor 412A electrically connected between the phase A of the rotor and the ground 430. Similarly, phases B and C of the three-phase power from the rotor include a second filter 410B for phase B, and a third filter 410C for phase C, respectively. The power generation system 800 can be electrically grounded to shunt a leakage current associated with an isolation transformer of a power converter 162, such as an isolation transformer 226 of a line side converter 168, to the ground 430 through the capacitor 412 of each filter. Further, in applications in which only one phase includes a filter 410 electrically connected to the at least one phase, the power generation system 800 can be electrically grounded to shunt a leakage current associated with an isolation transformer of a power converter 162 to a ground 430 through the capacitor 412 of the at least one filter 410.

Figure 9:
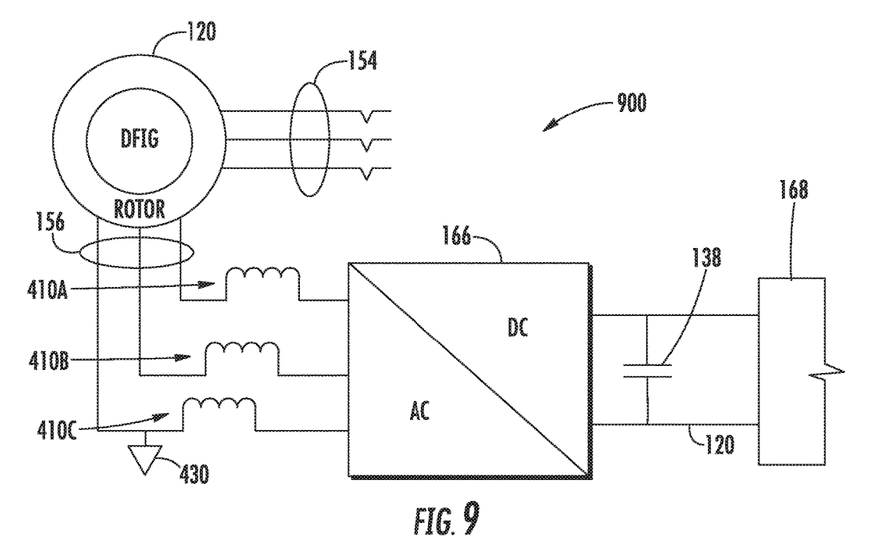
FIG. 9 depicts an example power system according to example aspects of the present disclosure.

Referring now to FIG. 9, a power generation system 900 according to example aspects of the present disclosure is depicted. Elements that are the same or similar to those as depicted in previous FIGS. are referred to with the same reference numerals. As shown, a DFIG 120 includes a rotor connected to a rotor side bus 156 and a stator connected to a stator side bus 154. Each phase of three-phase power output from the rotor is filtered by a filter 410, such as a first filter 410 A for phase A, a second filter 410 B for phase B, and a third filter 410 C for phase C. The three-phase power from the rotor side bus 156 is provided to the rotor side converter 166. Further, at least one phase of the three-phase rotor side bus 156 can be electrically connected to a ground 430. For example, as shown in FIG. 9, phase C is electrically connected to a ground 430. Additionally, any number of phases can be electrically connected to the ground 430.

Figure 10:
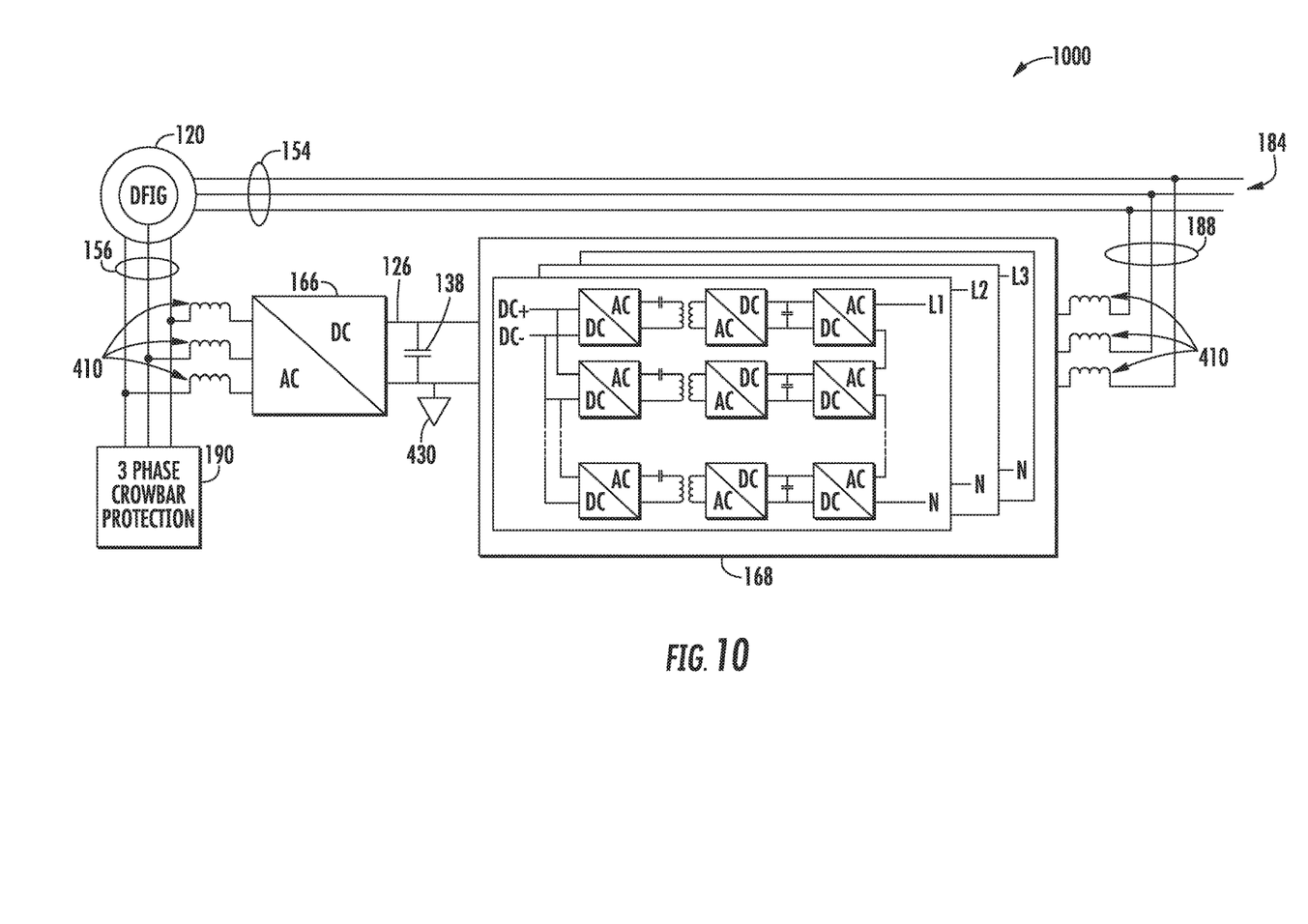
FIG. 10 depicts an example power system according to example aspects of the present disclosure.

Referring now to FIG. 10, an example power generation system 1000 according to example aspects of the present disclosure is depicted. Elements that are the same or similar to those depicted in previous FIGS. are referred to with the same reference numerals. As shown, a DFIG 120 includes a rotor connected to the rotor side bus 156 and a stator connected to a stator side bus 154. The rotor side bus 156 can be, for example, a LV bus. A stator side bus 154 can be, for example, a MV bus. The DFIG 120 can be configured to generate a LV AC power and provide the LV AC power to the rotor side bus 156. The DFIG 120 can be configured to generate a MV AC power and provide the MV AC power to the stator side bus 154. The LV AC power can be provided to the power converter 162, such as a rotor side converter 166 by the rotor side bus 156.

A filter 410 can be included to filter each phase of the three-phase power from the rotor before being provided to a rotor side converter 166. Additionally, a filter 410 can be included to filter each phase of the three-phase power between the line side converter 168 and the electrical grid 184. A multi-phase (e.g., three phase) crowbar protection circuit 110 can also be included to protect against overvoltage. A rotor side converter 166 can be coupled to a rotor side bus 156 and configured to convert three-phase LV AC power into a LV DC power. Rotor side converter 166 can be, for example, a two level AC to DC power converter configured to convert the three-phase alternating current power to a LV DC power, and can provide the DC power to a DC link 126. A DC capacitor 138 can be electrically connected to the DC link 126. A line side converter 168 can be coupled to the DC link 126, and configured to receive DC power from the DC link and convert it to a multiphase MV AC power suitable for a grid 184. The line side converter 168 can be, for example, a DC to DC to AC converter comprising one or more SiC MOSFETs and an isolation transformer, as depicted in FIG. 3.

In an embodiment, at least one pole of the DC link 126 can be connected to a ground 430. For example, the DC link can be connected directly to a ground 430, and the power generation system 1000 can be electrically grounded to shunt a leakage current to the ground 430 through the at least one pole of the DC link 126 connected to the ground 430.

Additionally, in an embodiment, a tap to provide power for auxiliary loads can be coupled to the DC link 126. For example, an auxiliary inverter can be coupled to the DC link 126 to provide power to one or more auxiliary loads. In an embodiment, a filter can be included at the output of the auxiliary inverter. For example, a filter can include an inductor and a filter capacitor. In such a configuration, the neutral of the filter capacitor can be electrically connected to a ground, which can allow for a leakage current to be shunted to ground. Additionally, in a power generation system 1000 which includes a DC power source, such as one or more solar panels or batteries/energy storage devices, the DC power source can be connected to the DC link 126. In such a system, one of the poles of the DC power source, such as the negative or positive pole of a solar panel or battery, can be electrically connected to a ground. A leakage current can be shunted to ground through the pole of the DC power source connected to the ground.

In an embodiment not depicted in FIG. 10, a high impedance resistor, such as a high impedance resistor 420, can be electrically connected between the at least one pole of the DC link 126 and the ground 430. In such a power generation system 1000, the power generation system can be electrically grounded to shunt a leakage current from a power converter to the ground 430 through the high impedance resistor connected to the at least one pole of the DC link 126.

Figure 11:
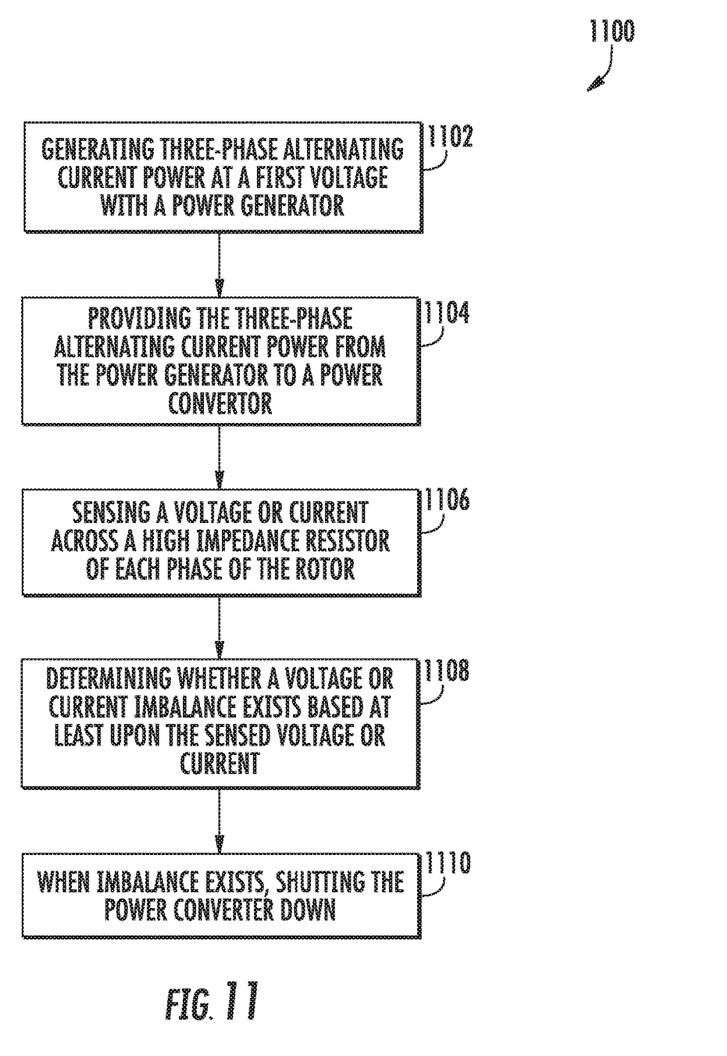
FIG. 11 depicts a method according to example aspects of the present disclosure.

Referring now to FIG. 11, a method (1100) for providing power according to example aspects of the present disclosure is depicted. At (1102), the method (1100) can include generating three-phase alternating current power at a first voltage with a power generator. The power generator can include a multiphase rotor and stator. The phases of the rotor can be configured in a delta or Wye configuration. Each phase of the rotor can include a high impedance resistor electrically connected to the phase and a ground. For example, each phase of a rotor can include a high impedance resistor 420 connected between the phase and a ground 430.

At (1104), the method (1100) can include providing the three-phase alternating current power from the power generated to a power converter. The power converter can include one or more SiC MOSFETs and an isolation transformer. The power converter can be configured to convert the three-phase alternating current power from the power generator at the first voltage to three-phase alternating current power at a second voltage. For example, a power converter 162 can include a rotor side converter 166 and a line side converter 168. The rotor side converter 166 can be, for example, a two-level AC to DC power converter. The AC to DC power converter can be coupled to a DC link 126, which can further be coupled to a line side converter 168, which can be a DC to DC to AC power converter. The DC to DC to AC power converter can include one or more SiC MOSFETs and an isolation transformer. The power converter can be configured to convert the three-phase alternating current power at the first voltage to three-phase alternating current power at a second voltage. For example, the power converter can be a power converter 162 configured to convert a LV AC power to a MV AC power suitable for a grid 184.

At (1106), the method (1100) can include a sensing, by a control device, a voltage or current across the high impedance resistor of each phase of the rotor. For example, a control device 174 can be in communication with one or more voltage or current sensors, which can be configured to sense a voltage or current across a high impedance resistor 420 connected to each phase of a rotor. The control device 174 can be configured to receive the sensed measurements from the one or more voltage or current sensors.

At (1108), the method (1100) can include determining, by the control device, whether a voltage or current imbalance exists based at least upon the sensed voltage or current across the high impedance resistor of each phase of the rotor. For example, a control device 174 can be configured to compare a voltage across at least two high impedance resistors 420, such as by comparing the voltage across each high impedance resistor 420 of each phase of the rotor. If the sensed voltage across the high impedance resistors 420 is imbalanced, such as, for example, when the voltage levels of two or more high impedance resistors 420 vary from each other by an amount that exceeds a threshold, the control device 174 can determine that a voltage imbalance exists. Similarly, the control device can be configured to determine whether a current in balance exists based on one or more current measurements by comparing the current through at least two high impedance resistors 420, such as by comparing the current through each high impedance resistor 420 of each phase of the rotor. If the sensed current is imbalanced, such as, for example, when the current levels of two or more high impedance resistors 420 vary from each other by an amount that exceeds a threshold, the control device 174 can determine that a current imbalance exists.

When a voltage or current imbalance exists, at (1110), the method (1100) can include shutting the power converter down, open one or more switches (not shown), or perform other control actions to electrically isolate the faulted power generation unit by the control device to protect the power converter. For example, a control device 174 can disconnect a power converter 162 from a power generation system 100 in order to protect the power converter 162 from a fault current.

In this way, the systems and methods according to example embodiments of the present disclosure can have a technical effect of shunting a leakage current associated with an isolation transformer and other components in a power converter to a ground, and further, in applications in which one or more high impedance resistors are used, can allow for voltage and current imbalance detection and system protection schemes to be implemented.

Figure 12:
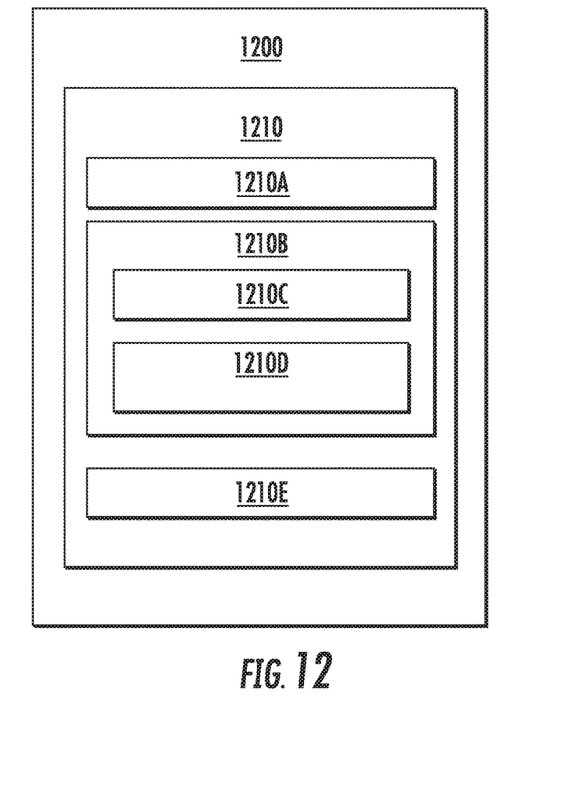
FIG. 12 depicts elements suitable for use in a control device according to example aspects of the present disclosure.

FIG. 12 depicts an example computing system 1200 according to example embodiments of the present disclosure. The computing system 1200 can be used, for example, as a control device 174 in a power generation system. The computing system 1200 can include one or more computing device(s) 1210. The computing device(s) 1210 can include one or more processor(s) 1210A and one or more memory device(s) 1210B. The one or more processor(s) 1210A can include any suitable processing device, such as a microprocessor, microcontroller, integrated circuit, logic device, and/or other suitable processing device. The one or more memory device(s) 1210B can include one or more computer-readable media, including, but not limited to, non-transitory computer-readable media, RAM, ROM, hard drives, flash drives, and/or other memory devices.

The one or more memory device(s) 1210B can store information accessible by the one or more processor(s) 1210A, including computer-readable instructions 1210C that can be executed by the one or more processor(s) 1210A. The instructions 1210C can be any set of instructions that when executed by the one or more processor(s) 1210A, cause the one or more processor(s) 1210A to perform operations. In some embodiments, the instructions 1210C can be executed by the one or more processor(s) 1210A to cause the one or more processor(s) 1210A to perform operations, such as any of the operations and functions for which the computing system 1200 and/or the computing device(s) 1210 are configured, the operations for operating a power generation system (e.g., method 1100), as described herein, and/or any other operations or functions of the one or more computing device(s) 1210. The instructions 1210C can be software written in any suitable programming language or can be implemented in hardware. Additionally, and/or alternatively, the instructions 1210C can be executed in logically and/or virtually separate threads on processor(s) 1210A. The memory device(s) 1210B can further store data 1210D that can be accessed by the processor(s) 1210A. For example, the data 1210D can include data indicative of power flows, current flows, actual voltages, ground fault currents, nominal voltages, and/or any other data and/or information described herein.

The computing device(s) 1210 can also include a network interface 1210E used to communicate, for example, with the other components of system 1200 (e.g., via a network). The network interface 1210E can include any suitable components for interfacing with one or more network(s), including for example, transmitters, receivers, ports, controllers, antennas, and/or other suitable components. For example, the network interface 1210E can be configured to communicate with one or more sensors in a power generation system.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The present disclosure is discussed with reference to DFIG power generation systems including a power converter utilizing silicon carbide MOSFETs and an isolation transformer for purposes of illustration and discussion. Those of ordinary skill in the art, using the disclosures provided herein, will understand that other power generation systems and/or topologies can benefit from example aspects of the present disclosure. For instance, the grounding and protection schemes disclosed herein can be used in a wind, solar, gas turbine, or other suitable power generation system. Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A power generation system, comprising:
    a power generator comprising a multiphase rotor, the power generator configured to generate multiphase alternating current power at a first voltage;
    a power converter comprising one or more silicon carbide MOSFETs and an isolation transformer; the power converter configured to convert the multiphase alternating current power from the power generator at the first voltage to multiphase alternating current power at a second voltage;
    a ground;
    wherein the power generation system is electrically grounded to shunt a leakage current associated with the isolation transformer of the power converter to the ground through a plurality of resistors, wherein a plurality of the phases of the rotor comprise at least one of the plurality of resistors electrically connected to each phase of the multiphase rotor and the ground; and
    a control device configured to determine whether a voltage or current imbalance exists across at least two of the plurality of resistors, wherein the control device is further configured to shut down the power converter when the control device determines the voltage or current imbalance exists across at least two of the plurality of resistors.

2. The power generation system of claim 1, wherein the plurality of resistors comprises at least a first resistor and a second resistor; and
    wherein at least a first phase and a second phase of the multiphase rotor are electrically connected to the ground, and wherein the first phase of the multiphase rotor further comprises the first resistor electrically connected to the first phase and the ground, and said second phase of the multiphase rotor further comprises the second resistor electrically connected to the second phase and the ground.

3. The power generation system of claim 1,
    wherein the power generation system is electrically grounded to shunt a leakage current associated with the isolation transformer of the power converter to the ground through each of the plurality of resistors; and
    wherein the control device is further configured to shut down the power converter when the control device determines a voltage or current imbalance exists across the plurality of resistors.

4. The power generation system of claim 1, wherein the phases of the rotor are electrically connected in a wye configuration.

5. The power generation system of claim 1, wherein the power converter comprises an AC to DC power converter and a DC link, wherein the AC to DC converter is electrically connected to the DC link;
    wherein the plurality of resistors comprises at least a first resistor and a second resistor;
    wherein a first pole of the DC link is connected to the first resistor and the ground and a second pole of the DC link is connected to the second resistor and the ground; and
    wherein the power generation system is electrically grounded to shunt a leakage current associated with the isolation transformer of the power converter to the ground through at least the first resistor and the second resistor.

6. The power generation system of claim 5, further comprising:
    a plurality of resistors connected in series across the DC link, the plurality of resistors defining a midpoint of the plurality of resistors,
        wherein the midpoint of the plurality of resistors is connected to the ground; and
        wherein the power generation system is electrically grounded to shunt a leakage current associated with the isolation transformer of the power converter to the ground through at least one of the plurality of resistors connected across the DC link.

7. The power generation system of claim 1, further comprising:
at least one filter, the filter comprising an inductor and a capacitor, the capacitor electrically connected to the ground, the at least one filter electrically connected to at least one phase of the rotor; and
wherein the power generation system is electrically grounded to shunt a leakage current associated with the isolation transformer of the power converter to the ground through the capacitor of the at least one filter.

8. The power generation system of claim 6, further comprising:
at least one filter electrically connected to each phase of the rotor, each filter comprising an inductor and a capacitor, each capacitor electrically connected to the ground; and
wherein the power generation system is electrically grounded to shunt a leakage current associated with the isolation transformer of the power converter to the ground through the capacitor of each filter.

9. A method of operating a power generation system, comprising:
generating multiphase alternating current power at a first voltage with a power generator, the power generator comprising a multiphase rotor and stator, the phases of the rotor configured in a delta or Wye configuration, each phase of the rotor comprising a high impedance resistor electrically connected to the phase and to a ground;
providing the multiphase alternating current power from the power generator to a power converter, the power converter comprising one or more silicon carbide MOSFETs and an isolation transformer, the power converter configured to convert the multiphase alternating current power from the power generator at the first voltage to multiphase alternating current power at a second voltage;
sensing, by a control device, a voltage or current across the high impedance resistor of each phase of the rotor;
determining, by the control device, whether a voltage or current imbalance exists based at least upon the sensed voltage or current across the high impedance resistor of each phase of the rotor;
when a voltage or current imbalance is determined to exist, shutting the power converter down by the control device to protect the power converter.

10. The method of claim 9, wherein each high impedance resistor is selected to carry a leakage current associated with the isolation transformer of the power converter.

11. The method of claim 9, wherein determining, by the control device, whether a voltage or current imbalance exists based at least upon the sensed voltage or current across the high impedance resistor of each phase of the rotor comprises comparing the voltage across at least two of the resistors that are electrically connected to each phase and to the ground.

12. The method of claim 11, wherein the control device is configured to determine a voltage imbalance exists when the voltage levels across the at least two resistors vary from each other by an amount that exceeds a threshold.

13. The method of claim 9, wherein determining, by the control device, whether a voltage or current imbalance exists based at least upon the sensed voltage or current across the high impedance resistor of each phase of the rotor comprises comparing the current through at least two resistors.

14. The method of claim 13, wherein the control device is configured to determine a current imbalance exists when the current levels through the at least two resistors vary from each other by an amount that exceeds a threshold.

15. The method of claim 9, wherein the power generator comprises a doubly fed induction generator comprising a multiphase rotor and a multiphase stator.

16. A power generation system, comprising:
a doubly fed induction generator comprising a multiphase rotor and a multiphase stator;
the doubly fed induction generator configured to generate a multiphase low voltage power on the rotor side and a multiphase medium voltage power on the stator side;
a low voltage bus electrically connected to the rotor;
a medium voltage bus electrically connected to the stator;
an AC to DC power converter electrically connected to the low voltage bus, the AC to DC power converter configured to receive low voltage power from the low voltage bus;
a DC link electrically connected to the AC to DC power converter and configured to receive DC power from the AC to DC power converter;
a DC to DC to AC power converter comprising at least one silicon carbide MOSFET and an isolation transformer, the DC to DC to AC power converter electrically connected to the DC link, the DC to DC to AC power converter configured to receive DC power from the DC link;
wherein the AC to DC power converter and the DC to DC to AC power converter are together configured to convert the low voltage power from the multiphase rotor to medium voltage power; and
a ground;
wherein the power generation system is electrically grounded to shunt a leakage current associated with the isolation transformer of the DC to DC to AC power converter to the ground through a plurality of resistors, wherein a plurality of the phases of the rotor comprise at least one of the plurality of resistors electrically connected to each phase of the multiphase rotor and the ground; and
a control device configured to determine whether a voltage or current imbalance exists across at least two of the plurality of resistors, wherein the control device is further configured to shut down the power converter when the control device determines the voltage or current imbalance exists across at least two of the plurality of resistors.

* * * * *